C. H. STARKEY.
Tire-Fastening for Vehicle-Wheels.
No. 223,182.    Patented Dec. 30, 1879.
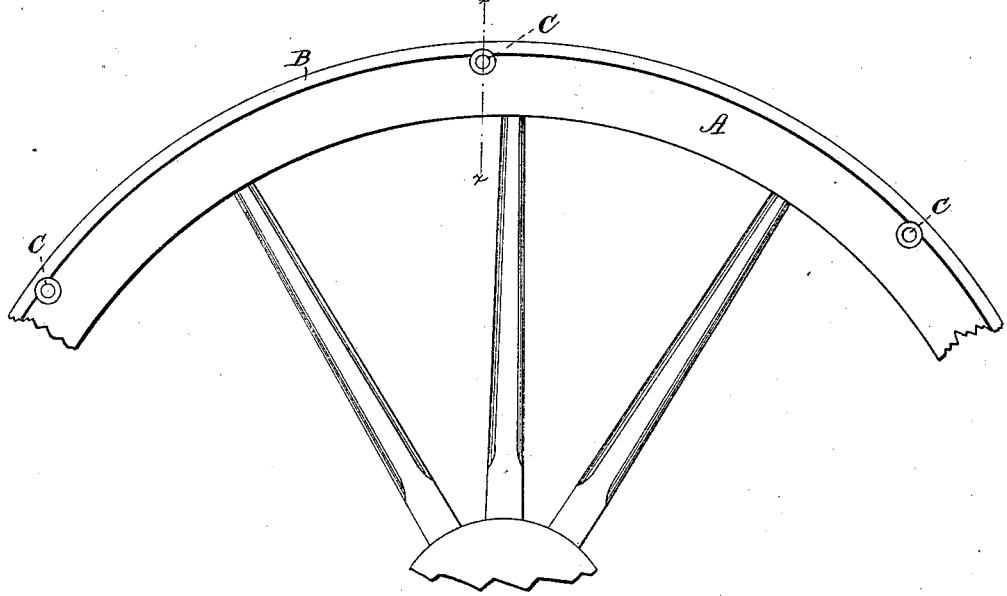
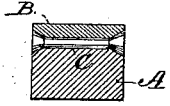
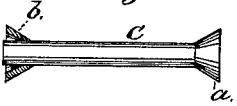
WITNESSES:
INVENTOR:
C. H. Starkey
BY
ATTORNEYS.

UNITED STATES PATENT OFFICE.

CHAUNCEY H. STARKEY, OF COLORADO SPRINGS, COLORADO, ASSIGNOR TO HIMSELF AND T. G. HORN, OF SAME PLACE.

IMPROVEMENT IN TIRE-FASTENINGS FOR VEHICLE-WHEELS.

Specification forming part of Letters Patent No. 223,182, dated December 30, 1879; application filed November 4, 1879.

*To all whom it may concern:*

Be it known that I, CHAUNCEY H. STARKEY, of Colorado Springs, in the county of El Paso and State of Colorado, have invented a new and Improved Tire-Fastening for Vehicle-Wheels; and I do hereby declare that the following is a full, clear, and exact description of the same, reference being had to the accompanying drawings, forming part of this specification, in which—

Figure 1 is a side view of a portion of a wheel with the tire-fastener applied. Fig. 2 is a transverse section through line $xx$ of Fig. 1. Fig. 3 is a detail of the rivet, bolt, and collar.

The object of my invention is to provide a simple and effective means for fastening the tires and fellies of vehicle-wheels together, so that the tire will not slip off from the contraction of the wood. This dislocation of the tire is of frequent occurrence, and as it generally results in the breakage of the wheel, it is a very serious difficulty, and is especially embarrassing when it happens to loaded wagons in the western country, where opportunity for repairs exist only at long intervals. Among the efforts to provide for this evil is a bolt placed in a transverse groove on the periphery of the felly, which bolt or rivet shank has at opposite ends plates, which project above the edge of the felly and grasp the tire to prevent lateral displacement. The objection to this is, that these plates form a projection on the side of felly and tire, which brings it into excessive abrasion with the sand, stones, and rough surface of the country, and which in a very short time entirely wears off these plates to the plane of the wheel, leaving the tire without security.

In remedying this difficulty my invention consists in making a countersink partly in the tire and partly in the edge of the felly, and riveting a bolt therein, so that the heads of the rivet fit the countersink, and their outer faces are flat and smooth, and in the same plane as the side of the felly, in which relation the tire is held securely against lateral displacement, and also against rotating on the felly, and by devices whose value does not rapidly depreciate from wear, since the heads of the rivets have no sensible projection, and only wear as the tire and felly wear, serving their natural office during the whole life of the wheel.

In the drawings, A represents a section of the felly, and B a section of the tire, of a vehicle-wheel, which are fastened together, in accordance with my invention, by rivet-bolts C. One of these rivet-bolts is shown in detail in Fig. 3, in which $a$ is a solid head, and $b$ a detached conical collar, into which the opposite end of the bolt is upset or riveted. The outer faces of both the heads or ends of the bolts are flat, while their inner sides taper in conical form to the stem of the bolt.

In applying these bolts, a groove is made across the periphery of the felly to receive the stem or shank of the bolt, and a countersink is then made, partly in the outer edge of the felly and partly in the adjacent inner edge of the tire, on each side, to receive the conical heads of the bolts, which are then inserted and riveted. When thus inserted the outer faces of the rivet-heads are flush with the side or face of the felly, having no projection beyond the plane of the wheel, and hence being subject to little or no wear, but still holding the tire firmly in place until worn out.

Having thus described my invention, what I claim as new is—

The combination, with the felly and tire of a vehicle-wheel having their adjacent edges countersunk, as described, of a rivet-bolt having heads fitting in said countersinks, with their outer faces flush with the sides of the felly, substantially as and for the purpose described.

CHAUNCEY HECKMAN STARKEY.

Witnesses:
 FRANK PERKINS,
 JOHN POTTER.